(12) United States Patent
Chen

(10) Patent No.: US 7,646,080 B2
(45) Date of Patent: Jan. 12, 2010

(54) PROTECTIVE FILM STRUCTURE

(75) Inventor: Ga-Lane Chen, Santa Clara, CA (US)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 389 days.

(21) Appl. No.: 11/615,910

(22) Filed: Dec. 22, 2006

(65) Prior Publication Data

US 2008/0020563 A1  Jan. 24, 2008

(30) Foreign Application Priority Data

Jul. 21, 2006  (CN) .................... 2006 1 0061747

(51) Int. Cl.
*H01L 13/58* (2006.01)
(52) U.S. Cl. .................. 257/637; 257/635; 257/646; 257/E23.194; 257/E23.586
(58) Field of Classification Search ......... 257/629–637, 257/626, 646; 438/694–703
See application file for complete search history.

(56) References Cited

U.S. PATENT DOCUMENTS 5,190,807 A * 3/1993 Kimock et al. ............. 428/216
5,440,507 A * 8/1995 Brady et al. ................ 365/127
5,879,823 A * 3/1999 Prizzi et al. ................ 428/698
6,593,015 B1 * 7/2003 Inspektor ................... 428/698

FOREIGN PATENT DOCUMENTS

WO    WO 2005/014882 A1    2/2005

OTHER PUBLICATIONS

Sun Jintan, Qiu Derun; Amorphous Boron Carbide Film; Journal of Hefei University of Technology (Natural Science); Sep. 1993, vol. 16, No. 3, pp. 165-168, Hefei.
Zhang Yuhui; Synthesis of Non-Crystal Boron Nitride Thin Films and Its Application in Cutting Tool; Tool Engineering; Jul. 18, 1984, vol. 28, p. 22, Chengdu.

* cited by examiner

*Primary Examiner*—Dung A. Le
(74) *Attorney, Agent, or Firm*—Clifford O. Chi

(57) ABSTRACT

A protective film structure (100) includes a base (110) and a resistive film (120) formed on a surface of the base. The base is comprised of amorphous boron nitride or amorphous boron carbide, and is formed on a surface of a substrate (10) to be protected. The resistive film includes an adhesive layer (121), an intermediate layer (122) and an outermost layer (123), which are formed on a surface of the base one on top of the other in that order.

15 Claims, 5 Drawing Sheets

PROTECTIVE FILM STRUCTURE

BACKGROUND OF THE INVENTION

1. Field of the Invention

The present invention relates to protective films and particularly to a protective film structure for portable electronic devices.

2. Description of Related Art

With the development of wireless communication technology and information processing technology, portable electronic devices, such as mobile telephones and notebooks, are now in widespread use. These electronic devices enable consumers to enjoy the convenience of high technology services, anytime and at virtually any location.

Generally, an electronic device has most of its electronics in one housing, called a body. The exterior surface of the body is normally made of light weight plastics or magnesium alloy. However, plastic products give customers a "cheap" feeling. The mechanical properties of magnesium alloy decay overtime. The magnesium alloy also has a rough surface, poor corrosion resistance and is highly inflammable.

What is needed, therefore, is to provide a protective film structure with good corrosion resistance, good surface roughness and hardness, as well as good mechanical properties.

SUMMARY OF THE INVENTION

The present invention relates to a protective film structure. The protective film structure includes a base and a resistive film formed on a surface of the base. The base can be comprised of amorphous boron nitride or amorphous boron carbide, and is formed on a surface of a substrate to be protected. The resistive film includes an adhesive layer, an intermediate layer and an outermost layer, which are formed on a surface of the base in turn.

BRIEF DESCRIPTION OF THE DRAWINGS

Many aspects of the present protective film can be better understood with reference to the following drawings. The components in the drawings are not necessarily drawn to scale, the emphasis instead being placed upon clearly illustrating the principles of the present protective film. Moreover, in the drawings, like reference numerals designate corresponding parts throughout the several views.

DETAILED DESCRIPTION OF THE INVENTION

Reference will now be made to the drawings to describe in detail the preferred embodiments of the protective film.

Figure 1:
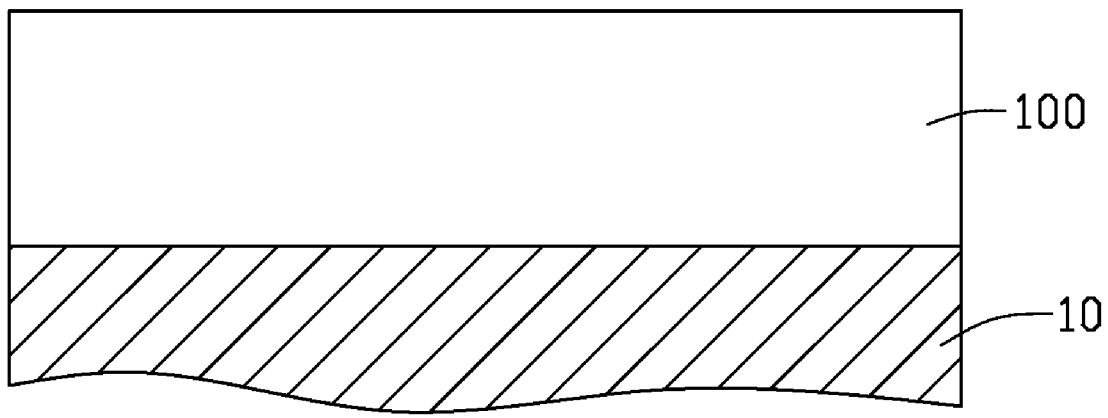
FIG. 1 is a cross-sectional schematic view of a substrate coated a protective film in accordance with a first embodiment.
Figure 2:
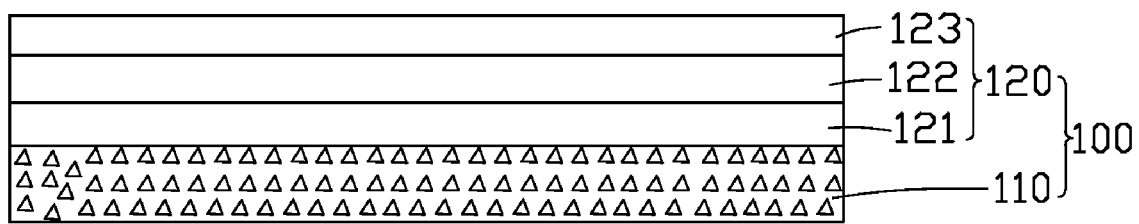
FIG. 2 is a cross-sectional schematic view of the protective film of FIG. 1.

Referring to FIGS. 1 and 2, a protective film 100 includes a base 110 and a resistive film 120 formed on a surface of the base 110. The base 110 is formed on a surface of a substrate 10 to be protected. The resistive film 120 includes an adhesive layer 121, an intermediate layer 122 and an outermost layer 123, which are formed on the surface of the base 110 one on top of the other in that order.

The base 110 is comprised of amorphous materials, such as amorphous boron nitride and amorphous boron carbide, or both amorphous boron nitride and amorphous boron carbide. The base 110 can further contain nano particles. The nano particles are selected from the group consisting of carbon nano tubes, carbon nano sticks, carbon 60, carbon particles, nano-sized conductive metals, nano-sized semiconductors, and any combination thereof.

The adhesive layer 121 is configured for enhancing adhesion between the base 110 and the intermediate layer 122. The adhesive layer 121 is comprised of a material with good adhesiveness and adsorption. The material is selected from the group consisting of chromium and titanium. Both chromium and titanium have good corrosion resistance. The adhesive layer 121 containing chromium or titanium is a good vacuum getter, which has strong adhesion to the base 110.

The intermediate layer 122 can be matched with the adhesive layer 121 and the outermost layer 123 by adjusting lattice constant of itself. A material of the intermediate layer 122 is selected from the group consisting of chromium nitride and titanium nitride. The intermediate layer 122 made of chromium nitride or titanium nitride is a densified layer without porous issue. Thus, the intermediate layer 122 is corrosion resistant.

A material of the outermost layer 123 is selected from the group consisting of diamond-like carbon, aluminum nitride, and titanium dioxide. The diamond-like carbon has better resistance with high hardness. Aluminum nitride is a good heat conductor, so that it is good for heat dissipation use in mobile phones and notebooks. Titanium dioxide is a kind of photo catalyst, when applied to an outer surface of an electrical product it improves attributes including anti-bacteriaa and anti-viral disinfection, deodorization, detoxication, self-cleaning, and anti-fogging.

A first embodiment of the protective film 100 includes a base 110 and a resistive film 120 formed on a surface of the base 110. The resistive film 120 includes an adhesive layer 121, an intermediate layer 122, and an outermost layer 123, which are formed on the surface of the base 110 in turn. The base 110 is comprised of amorphous boron nitride. The adhesive layer 121 is comprised of titanium. The intermediate layer 122 is comprised of titanium nitride. The outermost layer 123 is comprised of titanium dioxide.

A manufacturing method of a mobile phone shell in accordance with the first embodiment is provided. Firstly, a substrate 10 is provided. A material of the substrate 10 can be plastic or metal. In the preferred embodiment, the substrate 10 is made of aluminum alloy and formed by successive punch forming processes. Secondly, a protective film 100 is formed on the substrate 10 in the following steps:

(1) forming the base 110 on the substrate 10;

(2) forming the adhesive layer 121 on the base 110;

(3) forming the intermediate layer 122 on the adhesive layer 121; and (4) forming the outermost layer 123 on the intermediate 122.

The base 110 can be formed on the substrate 10 by a physical vapor deposition process or a chemical vapor deposition process. The physical vapor deposition process includes any one of evaporation coating, sputter coating, ion coating, etc. In the first embodiment, the base 110 is formed on the substrate 10 by chemical vapor deposition. Firstly, the substrate 10 is arranged and exposed in a reaction vessel. Secondly, gaseous boron is introduced into the sealed reactor full of nitride. Then amorphous boron nitride particles are formed in the reaction vessel by controlling temperature and pressure. Finally, an amorphous boron nitride layer 110 is deposited on the substrate 10.

Good touch aesthetics can be acheived by using amorphous boron nitride in the material of the shell of the mobile phone because amorphous boron nitride has a small friction coefficient. In addition, amorphous boron nitride is lighter than other alloys, such as magnesium alloy. As well as this, amorphous boron nitride also has good thermal conductivity, chemical stability and oxidation resistance.

The adhesive layer 121, the intermediate layer 122, and the outermost layer 123 are formed on the base 110 in turn by a physical vapor deposition process or a chemical vapor deposition process. In the first embodiment, they are formed on the base 110 by sputtering. Firstly, a titanium target, a titanium nitride target, a titanium dioxide target and the substrate 10 coated with base 110 are arranged in a sealed sputtering chamber. Secondly, the titanium target is bombarded using an ion gun to form the adhesive layer 121 on the base 110. Thirdly, the titanium nitride target is bombarded using the ion gun to form the intermediate layer 122 on the adhesive layer 121. Finally, the titanium dioxide target is bombarded to form the outermost layer 123 on the intermediate layer 122.

Figure 3:
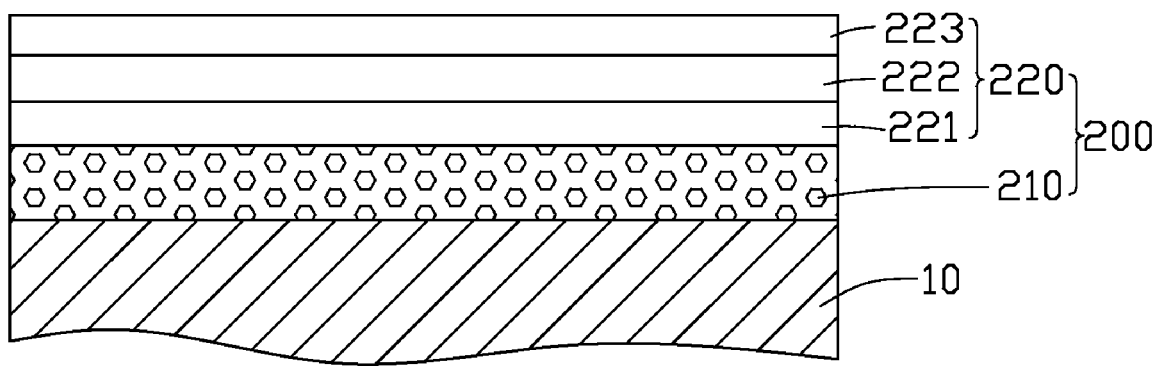
FIG. 3 is a cross-sectional schematic view of a protective film in accordance with a second embodiment.

Referring to FIG. 3, a second embodiment of the protective film 200 includes a base 210 and a resistive film 220 formed on a surface of the base 210. The resistive film 220 includes an adhesive layer 221, an intermediate layer 222, and an outermost layer 223, which are formed on the surface of the base 210 one on top of the other in that order. The base 210 is comprised of amorphous boron carbide. The adhesive layer 221 is comprised of chromium. The intermediate layer 222 is comprised of chromium nitride. The outermost layer 223 is comprised of aluminum nitride.

The manufacturing method of a mobile phone shell in accordance with the second embodiment is similar to the method of the first embodiment. The differences are that in the second embodiment, the sealed reaction vessel is filled with gaseous carbon instead of nitride during formation of the base 210, and a chromium target, a chromium nitride target, and an aluminum nitride target are put into the sputtering chamber instead of the titanium target, the titanium nitride target and the titanium dioxide target. The adhesive layer 221, the intermediate layer 222 and the outermost layer 223 are formed on the base 210 one on top of the other in that order.

Figure 4:
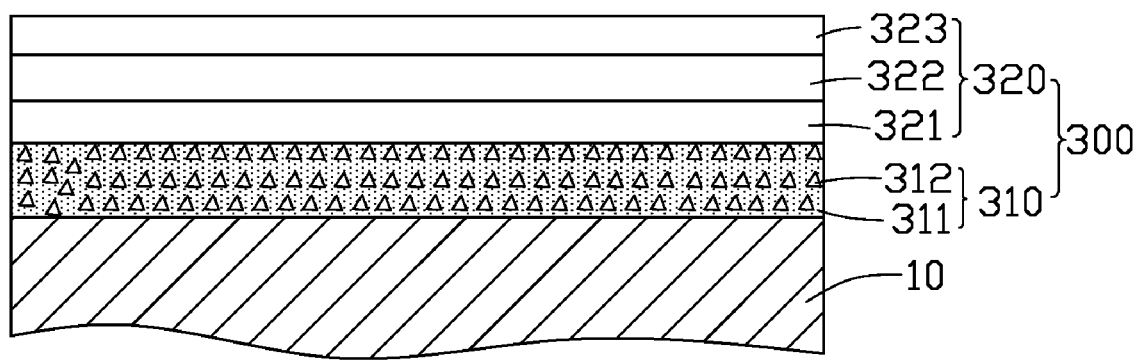
FIG. 4 is a cross-sectional schematic view of a protective film in accordance with a third embodiment.

Referring to FIG. 4, a third embodiment of the protective film 300 includes a base 310 and a resistive film 320 formed on a surface of the base 310. The resistive film 320 includes an adhesive layer 321, an intermediate layer 322, and an outermost layer 323, which are formed on the surface of the base 310 one on top of the other in that order. The base 310 is comprised of the nano particles 311 and amorphous boron nitride 312, i.e. mixing the nano particles 311 into the amorphous boron nitride 312. The adhesive layer 321 is comprised of titanium. The intermediate layer 322 is comprised of titanium nitride. The outermost layer 323 is comprised of diamond-like carbon.

The total amount of the nano particles 311 in the material of the base 310 ranges from about 0.1% to about 10% by weight. The nano particles 311 have an average grain size in the range from about 5 nm to about 200 nm. The average grain size is preferably in the range from about 10 nm to about 100 nm. The nano particles 311 are selected from the group consisting of carbon nano tubes, carbon nano sticks, carbon 60, carbon particles, nano-sized conductive metals, nano-sized semiconductors, and any combination thereof. In the preferred embodiment, the nano particles 311 are carbon nano tubes.

The manufacturing method of mobile phone shell in accordance with the third embodiment is similar to the method of the first embodiment. The difference is that the sealed reaction vessel filled with gaseous carbon to form the base 310.

Figure 5:
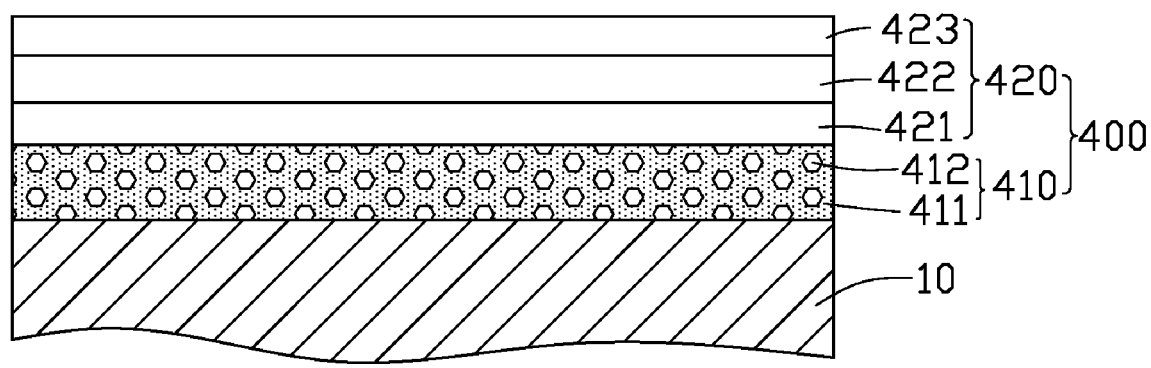
FIG. 5 is a cross-sectional schematic view of a protective film in accordance with a fourth embodiment.

Referring to FIG. 5, a fourth embodiment of the protective film 400 includes a base 410 and a resistive film 420 formed on a surface of the base 410. The resistive film 420 includes an adhesive layer 421, an intermediate layer 422, and an outermost layer 423, which are formed on a surface of the base 410 one on top of the other in that order. The base 410 is comprised of the nano particles 411 and amorphous boron carbide 412, i.e. the nano particles 411 are mixed into the amorphous boron carbide 412. The adhesive layer 421 is comprised of titanium. The intermediate layer 422 is comprised of titanium nitride. The outermost layer 423 is comprised of diamond-like carbon.

While the present invention has been described as having preferred or exemplary embodiments, the embodiments can be further modified within the spirit and scope of this disclosure. This application is therefore intended to include any variations, uses, or adaptations of the embodiments using the general principles of the invention as claimed. Further, this application is intended to include such departures from the present disclosure as come within known or customary practice in the art to which the invention pertains and which fall within the limits of the appended claims or equivalents thereof.

What is claimed is:

1. A protective film structure, comprising:
   a base comprised of a material selected from the group consisting of amorphous boron nitride and amorphous boron carbide;
   an adhesive layer formed on the base;
   an intermediate layer formed on the adhesive layer; and
   an outermost layer formed on the intermediate layer;
   wherein the base contains nano particles.

2. The protective film structure as described in claim 1, wherein the nano particles are comprised of a material selected from the group consisting of carbon nano tubes, carbon nano sticks, carbon 60, carbon particles, nano-sized conductive metals, nano-sized semiconductors, and any combination thereof.

3. The protective film structure as described in claim 1, wherein an average grain size of the nano particles is in the range from about 5 nm to about 200 nm.

4. The protective film structure as described in claim 3, wherein the average grain size of the nano particles is in the range from about 10 nm to about 100 nm.

5. The protective film structure as described in claim 1, wherein a percentage by weight of the nano particles in the material of the base is in the range from about 0.1% to about 10%.

6. The protective film structure as described in claim 1, wherein the adhesive layer is comprised of titanium, the intermediate layer is comprised of titanium nitride, and the outermost layer is comprised of diamond-like carbon.

7. The protective film structure as described in claim 1, wherein a material of the adhesive layer is selected from the group consisting of chromium, titanium and any combination thereof 8. The protective film structure as described in claim 1, wherein a material of the intermediate layer is selected from the group consisting of chromium nitride and titanium nitride.

9. The protective film structure as described in claim 1, wherein a material of the outermost layer is selected from the group consisting of diamond-like carbon, aluminum nitride, and titanium dioxide.

10. The protective film structure as described in claim 1, wherein the adhesive layer is comprised of titanium, the intermediate layer is comprised of titanium nitride, and the outermost layer is comprised of titanium dioxide.

11. The protective film structure as described in claim 1, wherein the adhesive layer is comprised of chromium, the intermediate layer is comprised of chromium nitride, and the outermost layer is comprised of aluminum nitride.

12. An article, comprising:
a main body;
a base formed on the main body, the base being comprised of a material selected from the group consisting of amorphous boron nitride and amorphous boron carbide;
an adhesive layer formed on the base;
an intermediate layer formed on the adhesive layer; and
an outermost layer formed on the intermediate layer;
wherein the base contains nano particles.

13. The article as described in claim 12, wherein a material of the adhesive layer is selected from the group consisting of chromium, titanium and a combination thereof.

14. The article as described in claim 12, wherein a material of the intermediate layer is selected from the group consisting of chromium nitride and titanium nitride.

15. The article as described in claim 12, wherein a material of the outermost layer is selected from the group consisting of diamond-like carbon, aluminum nitride, and titanium dioxide.

* * * * *

UNITED STATES PATENT AND TRADEMARK OFFICE
CERTIFICATE OF CORRECTION

PATENT NO.       : 7,646,080 B2                                   Page 1 of 1
APPLICATION NO.  : 11/615910
DATED            : January 12, 2010
INVENTOR(S)      : Ga-Lane Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this

Sixteenth Day of November, 2010

David J. Kappos
*Director of the United States Patent and Trademark Office*